US011526571B2

(12) United States Patent
Logasundaram Jaganathan

(10) Patent No.: US 11,526,571 B2
(45) Date of Patent: Dec. 13, 2022

(54) REQUESTING AN IP ADDRESS USING A NON-TEXTUAL BASED GRAPHICAL RESOURCE IDENTIFIER

(71) Applicant: International Business Machines Corporation, Armonk, NY (US)

(72) Inventor: Venkataramana Logasundaram Jaganathan, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/568,602

(22) Filed: Sep. 12, 2019

(65) Prior Publication Data

US 2021/0081485 A1 Mar. 18, 2021

(51) Int. Cl.
*G06F 16/955* (2019.01)
*G06F 16/953* (2019.01)
*G06F 16/901* (2019.01)
*H04L 67/01* (2022.01)

(52) U.S. Cl.
CPC ...... *G06F 16/9566* (2019.01); *G06F 16/9024* (2019.01); *G06F 16/953* (2019.01); *H04L 67/01* (2022.05)

(58) Field of Classification Search
CPC .............. G06F 16/9566; G06F 16/953; G06F 16/9024; H04L 67/42
USPC ........................................................ 709/209
See application file for complete search history.

(56) References Cited

U.S. PATENT DOCUMENTS

| | | | | |
|---|---|---|---|---|
| 5,319,721 A * | 6/1994 | Chefalas | ............. | G06K 9/6255 382/160 |
| 6,023,534 A * | 2/2000 | Handley | ............. | G06K 9/2054 382/257 |
| 6,285,785 B1 * | 9/2001 | Bellegarda | ............. | G06K 9/00 382/187 |
| 6,886,863 B1 * | 5/2005 | Mowry, Jr | ............. | B42D 25/29 235/494 |
| 7,020,670 B1 * | 3/2006 | Andreoli et al. | ... | G06F 15/0225 715/210 |
| 7,234,882 B2 * | 6/2007 | Takada | ...................... | B41J 3/32 400/109.1 |
| 7,502,511 B2 * | 3/2009 | McCormack et al. | ...................... | G06K 9/4685 345/419 |
| 7,551,778 B2 * | 6/2009 | Miyatake et al. | . | G06K 9/00449 382/163 |
| 7,871,271 B2 * | 1/2011 | Carro | ................... | G09B 21/001 434/113 |
| 7,978,363 B2 * | 7/2011 | Takayama | ........ | G06K 19/06037 358/1.18 |
| 8,385,811 B1 * | 2/2013 | Gedlinske | ................ | G09B 3/06 434/350 |
| 8,463,765 B2 * | 6/2013 | Lesavich | ............... | G06F 16/951 707/706 |

(Continued)

*Primary Examiner* — David P Zarka
(74) *Attorney, Agent, or Firm* — Robert J. Shatto

(57) ABSTRACT

A computer-implemented method comprises displaying a grid comprising a plurality of cells; receiving user input modifying a state of one or more of the plurality of cells to create a graphical shape in the grid, wherein each of the plurality of cells is limited to one of a plurality of predefined states; requesting an internet protocol (IP) address corresponding to the graphical shape; and in response to receiving the IP address corresponding to the graphical shape, retrieving a web resource located at the IP address.

19 Claims, 8 Drawing Sheets

(56) References Cited

U.S. PATENT DOCUMENTS

| | | | | |
|---|---|---|---|---|
| 8,548,253 B2* | 10/2013 | Besley | G06K 9/00442 | |
| | | | 382/203 | |
| 8,622,306 B2* | 1/2014 | Matsumoto | G06K 7/1417 | |
| | | | 235/469 | |
| 8,668,144 B2* | 3/2014 | Evevsky | G06F 21/31 | |
| | | | 235/380 | |
| 8,751,972 B2* | 6/2014 | Ouyang | G06F 3/0488 | |
| | | | 715/863 | |
| 8,825,810 B1* | 9/2014 | Easttom, II | G06F 9/548 | |
| | | | 709/227 | |
| 8,856,853 B2* | 10/2014 | Casagrande | H04N 21/44008 | |
| | | | 725/131 | |
| 8,994,663 B2* | 3/2015 | Harrow | G06F 3/04883 | |
| | | | 345/173 | |
| 9,070,000 B2* | 6/2015 | Terwilliger | H04W 12/50 | |
| 9,294,542 B2* | 3/2016 | Boudville | H04M 1/72445 | |
| 9,306,944 B2* | 4/2016 | Terwilliger | G06K 7/1417 | |
| 9,330,331 B2* | 5/2016 | Kasthuri | G06K 9/4609 | |
| 9,537,925 B2* | 1/2017 | Williamson | H04L 67/02 | |
| 9,727,657 B2* | 8/2017 | Goyal | G06F 16/9554 | |
| 9,734,255 B2* | 8/2017 | Jiang | G06F 16/9554 | |
| 9,798,944 B2 | 10/2017 | Duong | | |
| 10,013,546 B1* | 7/2018 | Johansson | G06F 21/36 | |
| 10,015,483 B2* | 7/2018 | Schaefer | H04N 21/4223 | |
| 10,042,523 B2* | 8/2018 | Kleinhout | G06F 16/955 | |
| 10,216,403 B2* | 2/2019 | Gay | G06F 21/36 | |
| 10,223,565 B2* | 3/2019 | Yeakley | G06F 40/143 | |
| 10,225,097 B2* | 3/2019 | Zsigmond | H04L 67/04 | |
| 10,402,060 B2* | 9/2019 | Gay | G06F 3/0484 | |
| 10,447,761 B2* | 10/2019 | Eschbach | H04L 67/14 | |
| 10,496,852 B1* | 12/2019 | Marimuthu | G06F 21/31 | |
| 10,558,355 B2* | 2/2020 | Bean | G06F 21/36 | |
| 10,599,836 B2* | 3/2020 | McCarty | H04L 63/1483 | |
| 10,732,800 B2* | 8/2020 | Shan | G06F 3/0482 | |
| 10,824,760 B2* | 11/2020 | Bandiwdekar | G06F 21/6254 | |
| 10,890,993 B2* | 1/2021 | Jagtman | G09B 21/003 | |
| 2003/0009495 A1* | 1/2003 | Adjaoute | G06F 40/20 | |
| | | | 715/255 | |
| 2005/0011958 A1* | 1/2005 | Fukasawa | G06K 7/1095 | |
| | | | 235/462.46 | |
| 2007/0279474 A1* | 12/2007 | Sato | G06K 1/126 | |
| | | | 347/110 | |
| 2008/0307331 A1 | 12/2008 | Kuwatani | | |
| 2010/0025470 A1* | 2/2010 | Nakagawa | G06F 3/03543 | |
| | | | 235/462.01 | |
| 2011/0145557 A1* | 6/2011 | Li | G06F 9/445 | |
| | | | 713/1 | |
| 2013/0054404 A1* | 2/2013 | Garcia | G06Q 30/0603 | |
| | | | 705/26.3 | |
| 2015/0088847 A1* | 3/2015 | Nelson | G06F 16/95 | |
| | | | 707/706 | |
| 2015/0277696 A1* | 10/2015 | DeLuca | G06F 3/04883 | |
| | | | 715/863 | |
| 2016/0086072 A1* | 3/2016 | Castillo | G06K 7/1095 | |
| | | | 235/494 | |
| 2016/0253069 A1* | 9/2016 | Zapletal | H04L 41/22 | |
| | | | 715/733 | |
| 2016/0342838 A1 | 11/2016 | Shah | | |
| 2017/0013091 A1 | 1/2017 | Aoki | | |
| 2017/0177851 A1* | 6/2017 | Sawant | G06F 21/36 | |
| 2017/0285932 A1* | 10/2017 | Hastings | G06F 40/109 | |
| 2018/0260108 A1* | 9/2018 | Hajimusa | G06F 3/04886 | |
| 2019/0034613 A1* | 1/2019 | Jajoo | H04L 63/0884 | |

* cited by examiner

REQUESTING AN IP ADDRESS USING A NON-TEXTUAL BASED GRAPHICAL RESOURCE IDENTIFIER

BACKGROUND

Typically, a web page or web resource is accessed by typing a text-based Uniform Resource Locator (URL) into a browser window's address bar. However, this approach has various limitations. In particular, the URL is usually based on Latin characters which limits its accessibility to a majority of the world's population (Example: Chinese, Indian population). The current solution to address the issue of Latin characters is called Internationalized Domain Names (IDN) which supports non-Latin characters in URLs. However, IDNs also have limitations. For example, provisioning and maintaining multiple URLs for the same website is not ideal as it adds additional burdens. Additionally, IDNs are susceptible to homograph attacks in which a malicious party may deceive users by exploiting the fact that many different characters look alike. For example, the Latin character "a" and the Cyrillic character "a" look alike. As many languages do not use Latin characters, there are various technical and language barriers to implementing a common address or identifier for a single web resource which can be used by users across languages and regions.

SUMMARY

Aspects of the disclosure may include a computer-implemented method, computer program product, and system. One example of the computer-implemented method comprises displaying a grid comprising a plurality of cells; receiving user input modifying a state of one or more of the plurality of cells to create a graphical shape in the grid, wherein each of the plurality of cells is limited to one of a plurality of predefined states; requesting an internet protocol (IP) address corresponding to the graphical shape; and in response to receiving the IP address corresponding to the graphical shape, retrieving a web resource located at the IP address.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
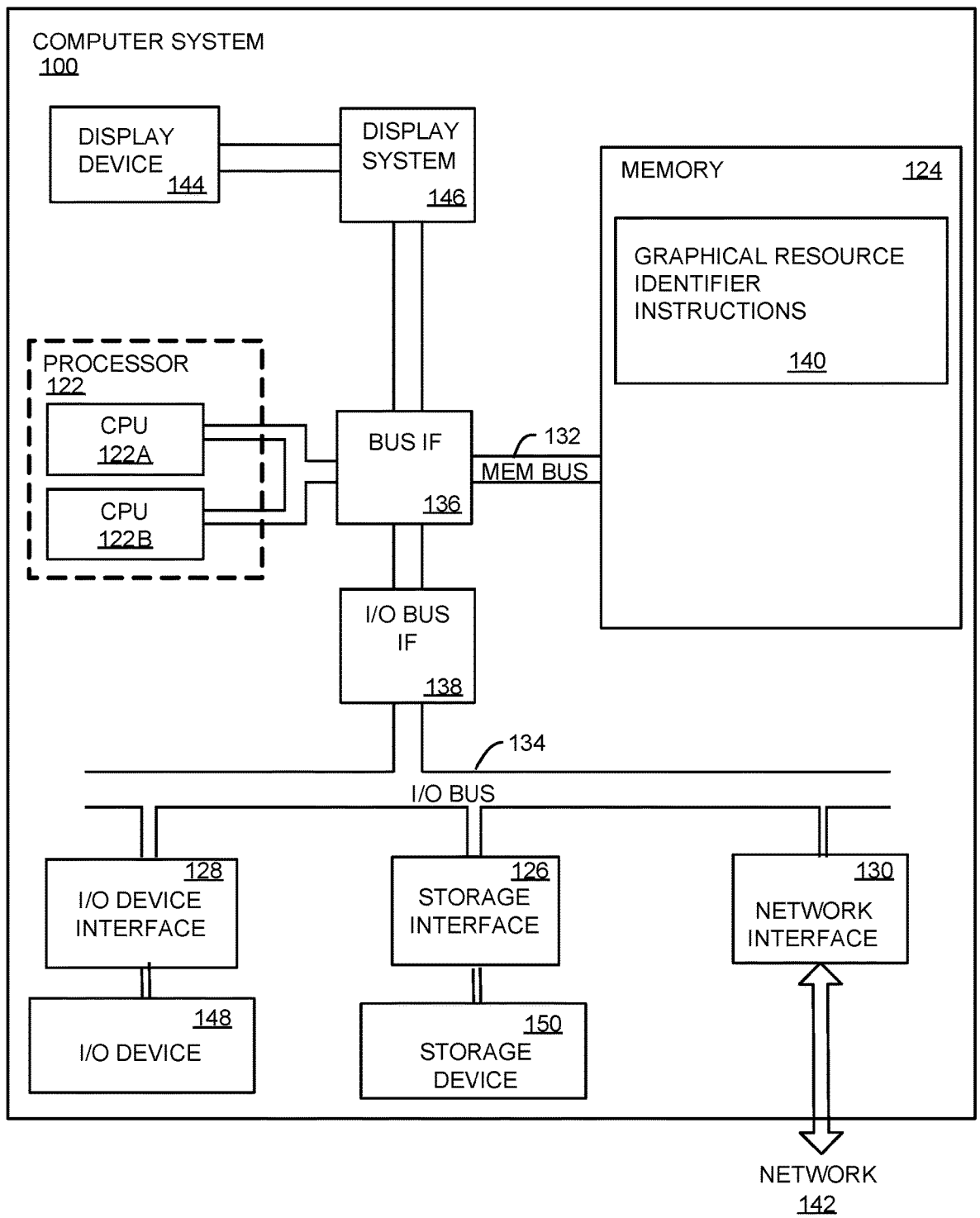
FIG. 1 is a high-level block diagram of one embodiment of an example computer system configured to implement a graphical resource identifier.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a high-level block diagram of one embodiment of an example computer system 100 configured to implement a graphical resource identifier (GRI). The components of the computer system 100 shown in FIG. 1 include one or more processors 122, a memory 124, a storage interface 126, an Input/Output ("I/O") device interface 128, and a network interface 130, all of which are communicatively coupled, directly or indirectly, for inter-component communication via a memory bus 132, an I/O bus 134, bus interface unit ("IF") 136, and an I/O bus interface unit 138.

In the embodiment shown in FIG. 1, the computer system 100 also includes one or more general-purpose programmable central processing units (CPUs) 122A and 122B, herein generically referred to as the processor 122. In some embodiments, the computer system 100 contains multiple processors. However, in other embodiments, the computer system 100 is a single CPU system. Each processor 122 executes instructions stored in the memory 124.

In some embodiments, the memory 124 includes a random-access semiconductor memory, storage device, or storage medium (either volatile or non-volatile) for storing or encoding data and programs. For example, the memory 124 may store graphical resource identifier instructions 140. In some embodiments, the memory 124 represents the entire virtual memory of the computer system 100 and may also include the virtual memory of other computer systems coupled directly to the computer system 100 or connected via a network 142. In some embodiments, the memory 124 is a single monolithic entity, but in other embodiments, the memory 124 includes a hierarchy of caches and other memory devices. For example, the memory 124 can exist in multiple levels of caches, and these caches may be further divided by function, so that one cache holds instructions while another holds non-instruction data, which is used by the processor. The memory 124 may be further distributed and associated with different CPUs or sets of CPUs, as is known in any various so-called non-uniform memory access (NUMA) computer architectures, for example.

Hence, although the graphical resource identifier instructions 140 are stored on the memory 124 in the example shown in FIG. 1 for purposes of explanation, it is to be understood that other embodiments can be implemented differently. For example, the graphical resource identifier instructions 140 can be distributed across multiple physical media in some embodiments.

Furthermore, in some embodiments, the graphical resource identifier instructions 140 are executed by the same processor 122. However, in other embodiments, execution of the graphical resource identifier instructions 140 are distributed across multiple processors located in the same or different computer systems. For example, in some such embodiments, at least a portion of the instructions and data structures associated with the graphical resource identifier instructions 140 can be on different computer systems and accessed remotely, e.g., via a network 142. The computer system 100 can use virtual addressing mechanisms that allow the programs of the computer system 100 to behave as if they only have access to a large, single storage entity instead of access to multiple, smaller storage entities. Thus, the memory 124 can store all or a portion of the various programs, modules, and data structures for performing the risk assessment functionality, as discussed herein.

The computer system 100 in the embodiment shown in FIG. 1 also includes a bus interface unit 136 to handle communications among the processor 122, the memory 124, the display system 146, and the I/O bus interface unit 138. The I/O bus interface unit 138 is coupled with the I/O bus 134 for transferring data to and from the various I/O units. In particular, the I/O bus interface unit 138 can communicate with multiple I/O interface units 128, 126, and 130, which are also known as I/O processors (IOPs) or I/O adapters (IOAs), through the I/O bus 134. The display system 146 includes a display controller, a display memory, or both. The display controller can provide video, audio, or both types of data to a display device 144. The display memory may be a dedicated memory for buffering video data. The display system 146 is coupled with the display device 144, such as a standalone display screen, computer monitor, television, a tablet or handheld device display, or another displayable device. In some embodiments, the display device 144 also includes one or more speakers for rendering audio. Alternatively, one or more speakers for rendering audio may be coupled with an I/O interface unit. In alternate embodiments, one or more functions provided by the display system 146 are on board an integrated circuit that also includes the processor 122. In addition, in some embodiments, one or more of the functions provided by the bus interface unit 136 is on board an integrated circuit that also includes the processor 122.

The I/O interface units support communication with a variety of storage and I/O devices. For example, the I/O device interface unit 128 supports the attachment of one or more user I/O devices 148, which may include user output devices (such as a video display devices, speaker, fax machine, printer, and/or television set) and user input devices (such as a keyboard, mouse, keypad, touchpad, trackball, buttons, light pen, or other pointing devices). A user can manipulate the user input devices 148 using a user interface, in order to provide input data and commands to the user I/O device 148 and the computer system 100. Furthermore, it is to be understood that, in some embodiments, the display device 144 can be integrated with a user input device to enable a touchscreen interface, as understood by one of skill in the art. Additionally, a user can receive output data via the user output devices. For example, a user interface may be presented via the user I/O device 148, such as displayed on a display device, played via a speaker, or printed via a printer.

The storage interface 126 supports the attachment of one or more disk drives or direct access storage devices 150 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 150 is implemented via any type of secondary storage device. The contents of the memory 124, or any portion thereof, may be stored to and retrieved from the storage device 150 as needed. The network interface 130 provides one or more communication paths from the computer system 100 to other digital devices and computer systems. For example, the network interface 130 can communicatively couple the computer system to other devices and systems via a wide area network such as the internet.

In operation, the processor 122 is configured to execute the graphical resource identifier instructions 140. For example, the graphical resource identifier instructions 140 are configured, in some embodiments, to cause the processor 122 to display a GRI interface on the display device 144. In some embodiments, the GM interface is displayed in response to receiving user input via an I/O device 148 such as, but not limited to, a click on a button for the GM interface. In other embodiments, the instructions 140 cause the processor 122 to display the GM interface in response to a detected event. One example of such an event is detecting a new tab being opened in an internet browser application ("browser"). In some such embodiments, the GM interface can be displayed on the new tab. In other embodiments, the graphical resource identifier instructions 140 can be configured to cause the processor 122 to display the GRI interface as a fixed element of the browser interface, similar to an address bar or search bar. It is to be understood that the graphical resource identifier instructions 140 can be stand alone instructions or they can be incorporated into code for other programs. For example, in some embodiments, the graphical resource identifier instructions 140 are incorporated into a larger body of code for a browser. Additionally, in some embodiments, the graphical resource identifier instructions 140 are part of a plugin or extension which can be added to a browser or other program.

Figure 2:
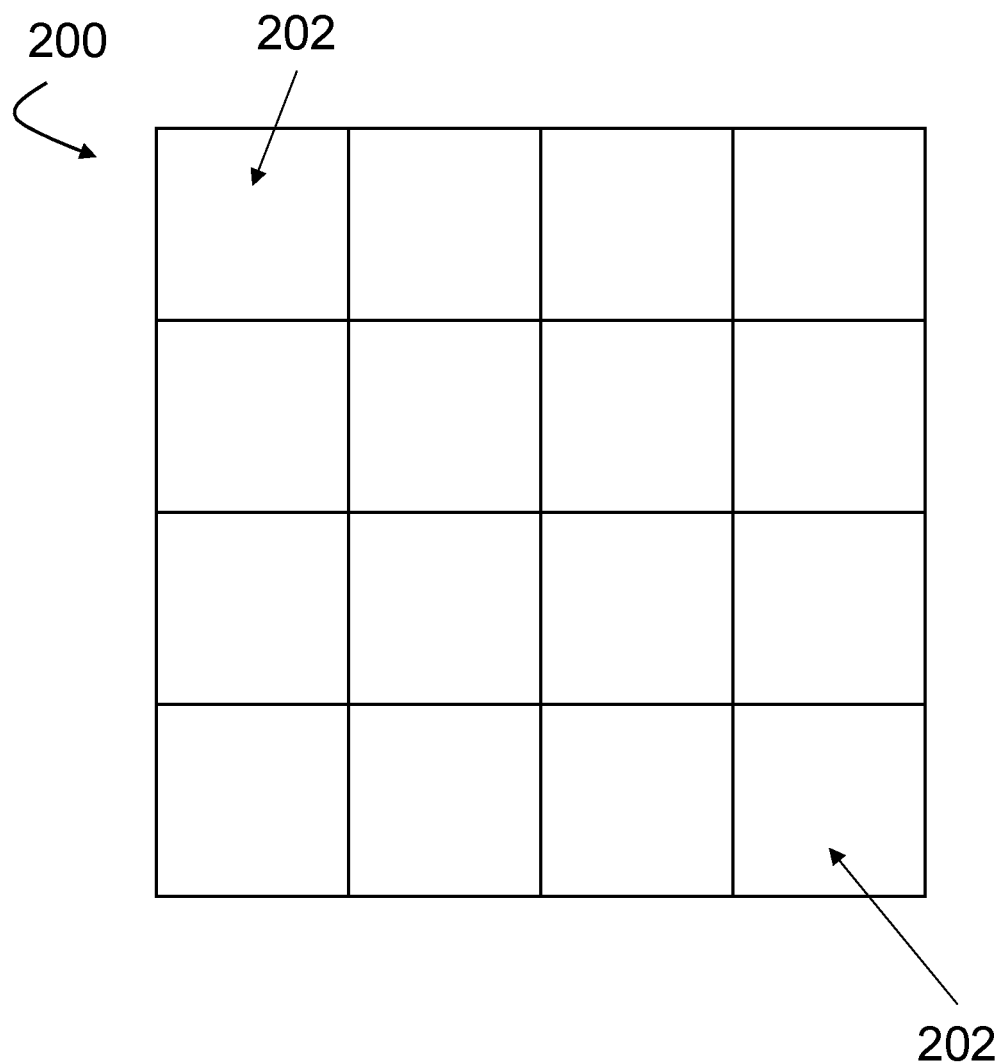
FIG. 2 depicts one embodiment of an example grid.

One example of a GM interface which is displayed on the display device 144 is shown in FIG. 2. In particular, the example GRI interface 200 is a 4×4 grid containing 16 square blocks or cells 202. However, it is to be understood that a GRI interface can be implemented differently in other embodiments. For example, in other embodiments, the GM interface can be larger (e.g. a 6×6 grid), smaller (e.g. a 3×3 grid), or of a different shape (e.g. a 2×4 rectangular grid). The processor 122 is configured to detect user input in one or more of the cells 202 of the GRI interface 200. For example, the user input can be acquired through touchscreen interface, a mouse, etc. The user input draws a pattern or graphical shape in the cells 202 of the GM interface 200. In particular, each cell 202 of the GM interface 200 is configured to accept a pre-determined set of possible patterns, in some embodiments. For example, in some such embodiments, each cell 202 is configured to accept one of two possible patterns resulting in 3 possible states for each cell 202, where one of the states is a blank cell.

Figure 3:
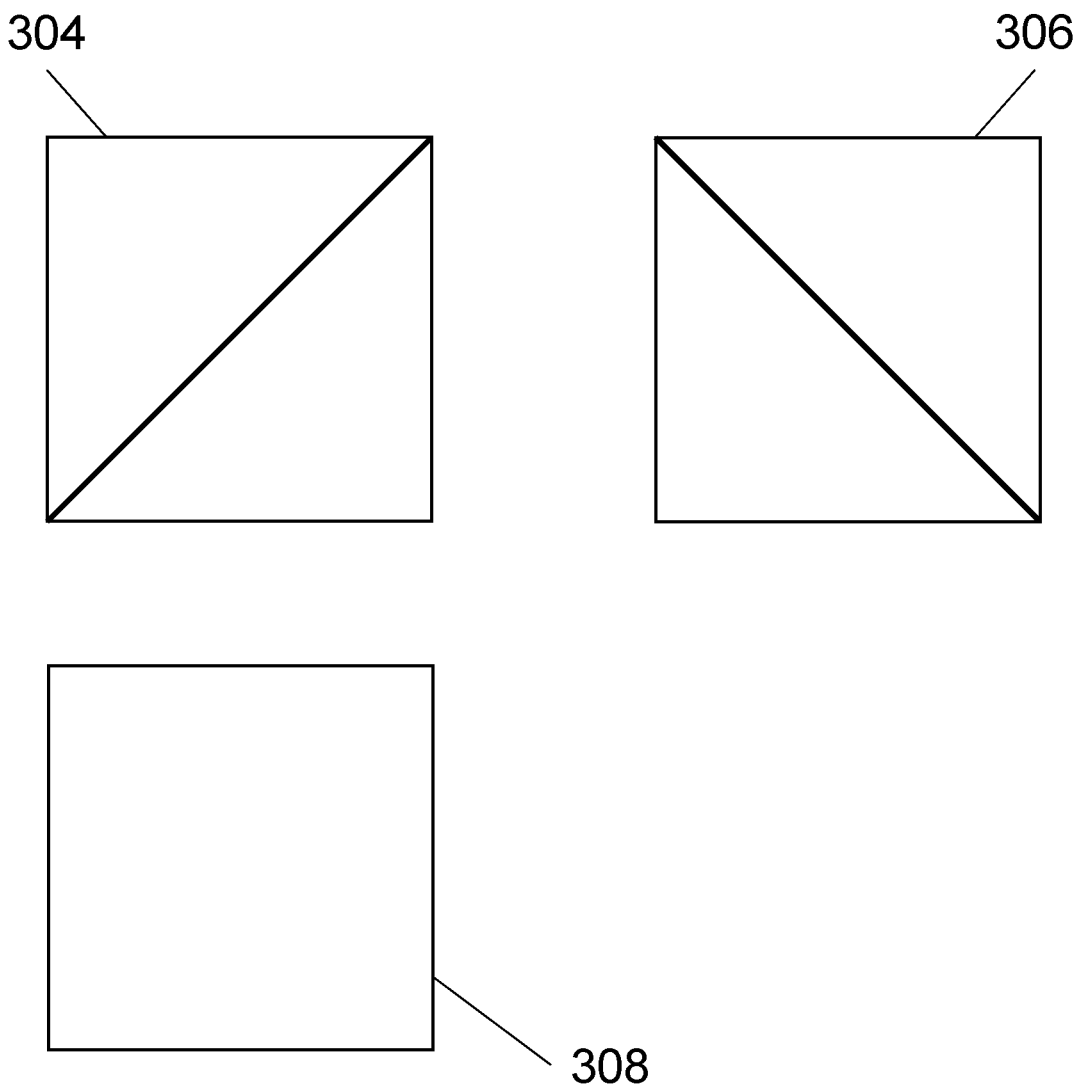
FIG. 3 depicts example allowed states of cells according to some embodiments.
Figure 4:
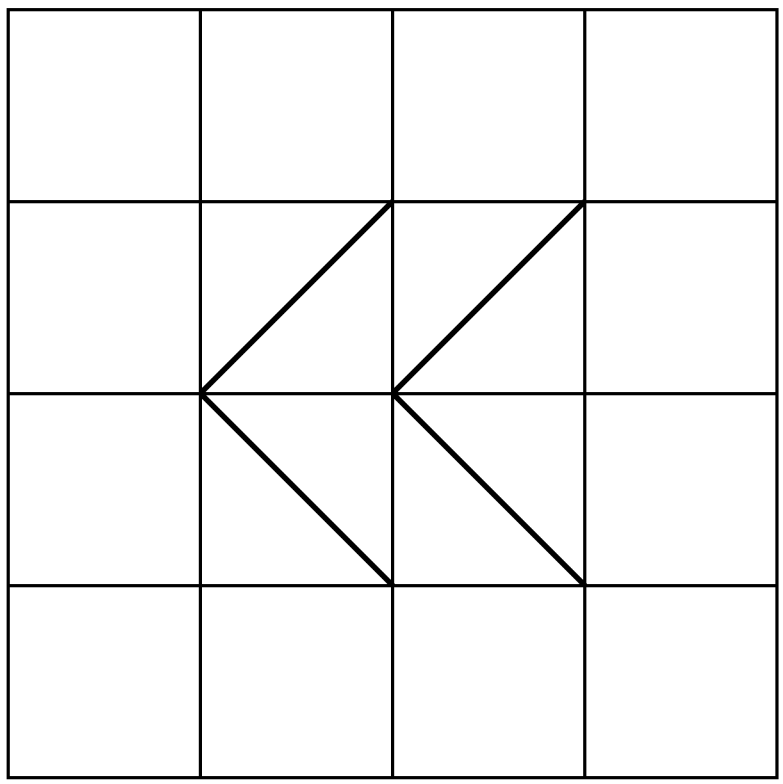
FIG. 4 depicts one example graphical resource identifier based on the example allowed states of FIG. 3.

FIG. 3 depicts possible states of each cell 202 in one such example embodiment. In particular, cell 304 represents a first state with a diagonal line from the upper right corner to the lower left corner of cell 304. Cell 306 represents a second state with a diagonal line from the upper left corner to the lower right corner of cell 306. Cell 308 represents the third state as a blank cell. In a 4×4 grid, such as the example GM interface 200 of FIG. 2, 3 possible states for each cell enables over 43 million possible patterns in the GM interface. One example pattern drawn in a 4×4 grid is shown in FIG. 4. As shown in FIG. 4, cells 410 and 412 each contain a diagonal line from the upper right corner to the lower left corner and cells 414 and 416 each contain a diagonal line from the upper left corner to the lower right corner while the remaining cells are blank.

Patterns or graphical shapes created by the different states of each cell can be registered in a repository Graphical Symbols Directory (GSD) along with the corresponding punycode. As understood by one of skill in the art, punycode is a representation of Unicode using a limited ASCII character subset supported by the domain name system. The processor 122, in this embodiment, is configured to detect the graphical shape created by the user input in the one or more cells of GRI interface 200 and to identify the corresponding punycode. For example, in some embodiments, the processor 122 can execute an Application Programming Interface (API) which connects the system 100 with a remote server that stores associations between the graphical shapes (also referred to herein as a graphical resource identifiers) and punycodes. The processor 122 can then request and load the appropriate website based on the punycode, in this embodiment. For example, the processor 122 can request the Internet Protocol (IP) address for the website from a Domain Name System (DNS) server coupled to the system 100 over the network interface 130 using the corresponding punycode via techniques known to one of skill in the art. Thus, the DNS server need not be modified, in such embodiment utilizing the punycode, and use of the graphical resource identifiers is transparent to the DNS server. Alternatively, the processor 122 can transmit the graphical resource identifier to the DNS server. In such embodiments, the graphical resource identifier is registered with the DNS server by the website owner such that the DNS server is configured to process the graphical resource identifier and look up the IP address of the corresponding website based on the graphical resource identifier.

After obtaining the IP address, the processor 122 contacts the server hosting the website/web resource and retrieves the website/web resource for output or for display in a browser window using techniques known to one of skill in the art. Thus, website owners can market or advertise their websites or brands using the registered graphical resource identifier rather than relying on a uniform resource locator (URL) which may be in a different language than that spoken by the targeted audience. By enabling users to locate and visit the websites using the respective graphical shapes, the embodiments described herein overcome language barriers in promoting a website across different regions and languages.

Furthermore, by limiting the possible states of each cell, the embodiments described herein reduce the load placed on components of the system 100 (or DNS server) to translate the graphical shape into the corresponding punycode as opposed to allowing any freeform pattern or drawing in each cell or grid. For example, the processor 122 can be configured to associate the graphical shape with its corresponding punycode by analyzing the points on the grid where the drawn lines end (i.e. the corners of each cell connected to one of the drawn lines). Alternatively, each possible cell state can be assigned a value such that the combining the values for each cell in the grid results in a total value that is associated with a corresponding punycode. Analyzing the graphical shape for the points in the grid or the values assigned to the cells requires less resources than would be required to perform image analysis on a freeform drawing using neural networks or other advanced image processing techniques to identify the pattern or graphical shape. It is to be understood that other techniques for analyzing the graphical shapes in the GRI interface can be used and that, due to the limited number of states of each cell, will require less resources than those required to perform image analysis on a freeform image or drawing. Furthermore, by reducing the processing load, the embodiments also enable faster response times in translating the graphical resource identifier into the corresponding punycode which can result in faster load times for loading the corresponding webpage.

Additionally, in some embodiments, the graphical resource identifier is not translated to a corresponding punycode. For example, in embodiments in which the graphical resource identifier is registered with the DNS server, the DNS server can be configured to associate the points connecting lines or values of each cell with a corresponding IP address. In other words, the DNS server does not need to translate the graphical resource identifier to an intermediate punycode in some such embodiments. The advantages in processing load discussed above with respect to translating to a punycode are also applicable to the processing load required to identify the IP address directly. In particular, the processing load required to identify the graphical resource identifier using the limited possible states, as discussed herein, is less than the processing required to identify the graphical resource identifier comprised of a freeform drawing using other image processing techniques.

Furthermore, limiting the possible states of each cell reduces possible human error in reproducing a pattern. For example, if a human is to reproduce a drawn shape, it is possible that the shape will not exactly match the intended shape which can result in errors in identifying the corresponding punycode. Using the techniques described herein, however, limits the states of each cell such that this type of human error is reduced. For example, in some embodiments, the diagonal lines can be drawn by dragging a line from one corner to the opposite corner. If the line is not drawn precisely connecting the two corners, the processor 122 can be configured to snap the line to the intended corners if the line is within a preset tolerance. The processor 122 can also be configured to not draw the line if the line does not match sufficiently with the location of the corners. In this way, the possibility of human error in reproducing the lines is reduced. Alternatively, in some embodiments, the processor 122 can be configured to cycle through the possible states of each cell in response to a user tap or click on the corresponding cell. This alternative technique similarly reduces the possibility of a human incorrectly reproducing the pattern in each cell.

Figure 5:
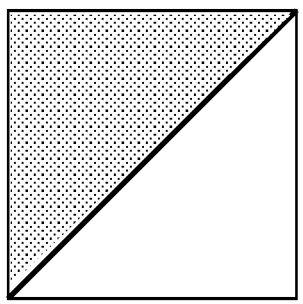
FIG. 5 depicts another example of allowed states of cells according to some embodiments.
Figure 5:
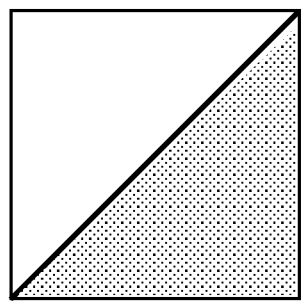
Figure 5:
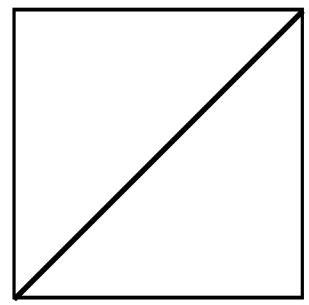
Figure 5:
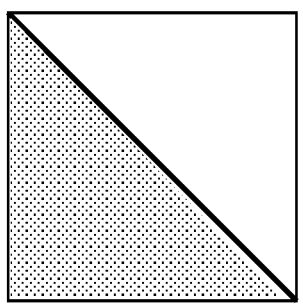
Figure 5:
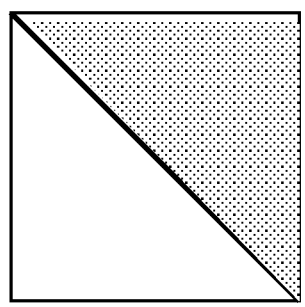
Figure 5:
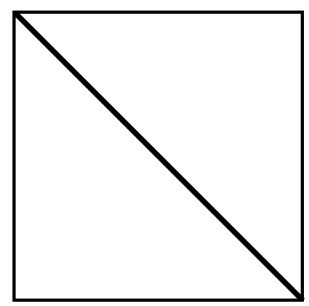
Figure 5:
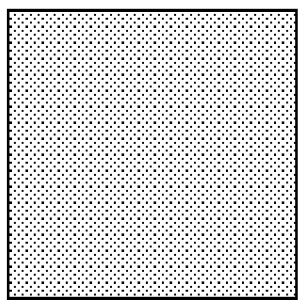
Figure 5:
Figure 6:
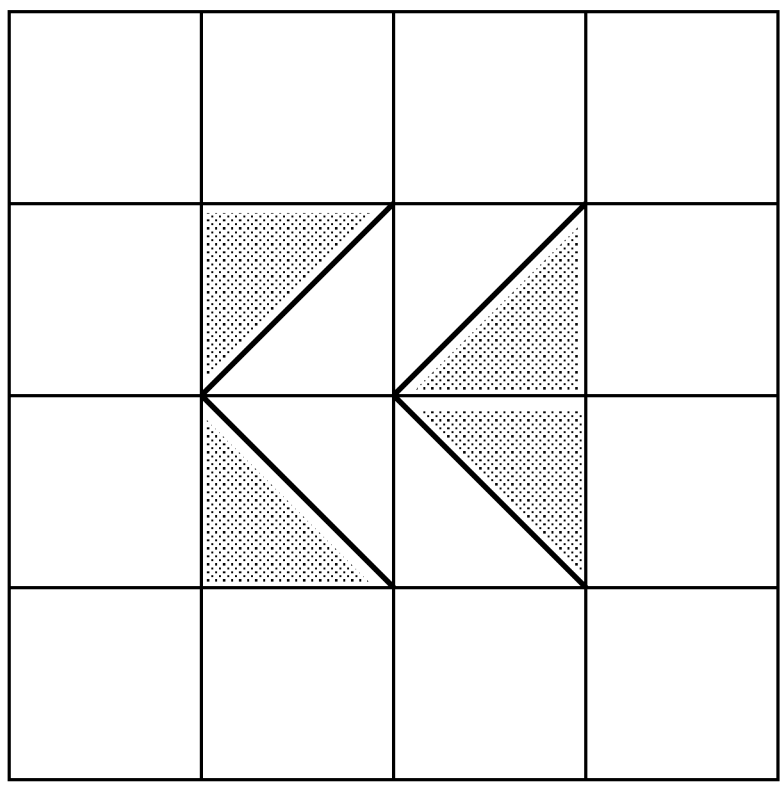
FIG. 6 depicts one example graphical resource identifier based on the example allowed states in FIG. 5.
Figure 7:
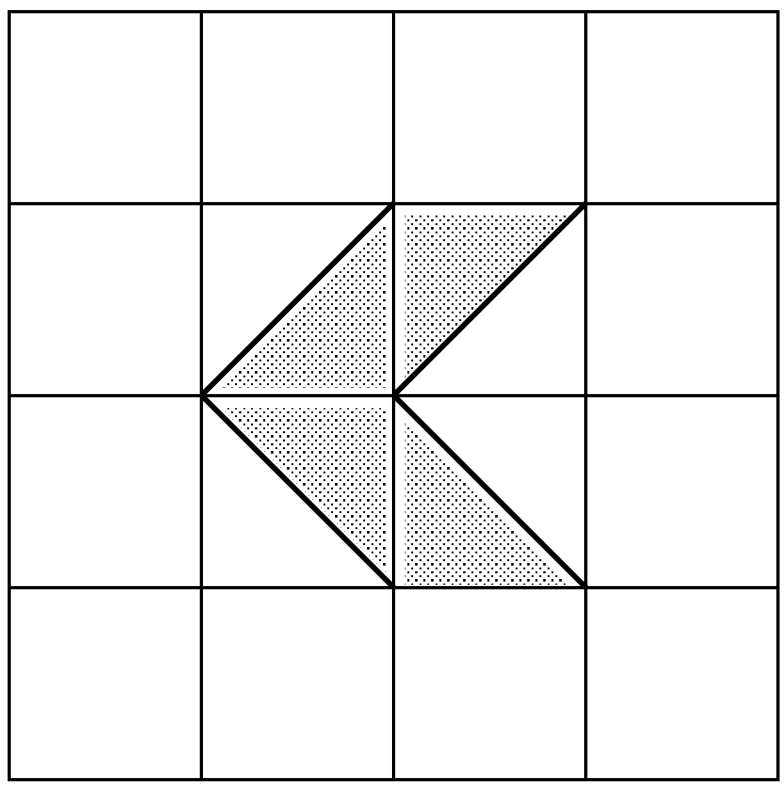
FIG. 7 depicts another example graphical resource identifier based on the example allowed states in FIG. 5.

It is to be understood that although the example in FIGS. 2 and 3 limit the possible states of each cell to 3 states, that other embodiments can include more or fewer possible states. For example, FIG. 5 depicts possible states of each cell in another example embodiments. In the example embodiment of FIG. 5, there are 8 possible states. In particular, the additional possible states are enabled in this embodiment by including shading of portions of each cell. Specifically, in this example cell 501 represents a first state with a diagonal line from the upper right corner to the lower left corner and shading to the left of the diagonal line. Cell 503 represents a second state with a diagonal line from the upper right corner to the lower left corner and shading to the right of the diagonal line. Cell 505 represents a third state with a diagonal line from the upper right corner to the lower left corner and no shading. Cell 507 represents a fourth state with a diagonal line from the upper left corner to the lower right corner and shading to the left of the diagonal line. Cell 509 represents a fifth state with a diagonal line from the upper left corner to the lower right corner and shading to the right of the diagonal line. Cell 511 represents a sixth state with a diagonal line from the upper left corner to the lower right corner and no shading. Cell 513 represents a seventh state with shading through the entire cell and no diagonal line. Cell 515 represents an eighth state with no shading and no diagonal lines. By using a 4×4 grid and the 8 possible states of the example in FIG. 5, this example embodiment enables more than 280 trillion possible graphical shapes in the GRI interface. For example, FIGS. 6 and 7 depict two different graphical shapes using the same diagonal lines as used in the example of FIG. 4, but with different shading. Each should graphical shape can be associated with a different punycode.

It is to be understood that other variations of possible predefined states of each cell in the GM interface can be used in other embodiments and the invention is not to be limited to those discussed herein. For example, in some embodiments, the lines and/or shading can include different color possibilities. Additionally, other types of lines can be used in other embodiments. For example, vertical lines, horizontal lines and/or diagonal lines connecting preset locations, other than the corners, along the edges of each cell can be used. Furthermore, in some embodiments, more than one line can be used in each cell. In some such embodiments, the multiple lines further divide the cell into more than two regions, with each region able to be shaded differently. Thus, by selecting the types of preset states through different allowed lines and shading along with selecting the size of the grid, sufficient unique patterns can be enabled for the billions of possible websites while also limiting the amount of space required in the browser window for the GRI interface to be displayed and overcoming the language barriers discussed above.

Additional details regarding an example method of using graphical resource identifiers to retrieve web resources, which can be performed by processor 122, are described below with respect to FIG. 8. Furthermore, although the computer system 100 shown in FIG. 1 illustrates a particular bus structure providing a direct communication path among the processors 122, the memory 124, the bus interface 136, the display system 146, and the I/O bus interface unit 138, in alternative embodiments the computer system 100 includes different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 138 and the I/O bus 134 are shown as single respective units, the computer system 100, can include multiple I/O bus interface units 138 and/or multiple I/O buses 134 in other embodiments. While multiple I/O interface units are shown, which separate the I/O bus 134 from various communication paths running to the various I/O devices, in other embodiments, some or all of the I/O devices are connected directly to one or more system I/O buses.

Furthermore, it is to be understood that the components shown in FIG. 1 are provided by way of example only and that, in other embodiments, other components in addition to or in lieu of those shown can be used and that some components shown in FIG. 1 can be omitted. For example, in some embodiments, the storage interface 126 and storage device 150 can be omitted. Additionally, as discussed above, in some embodiments, one or more of the components and data shown in FIG. 1 include instructions or statements that execute on the processor 122 or instructions or statements that are interpreted by instructions or statements that execute the processor 122 to carry out the functions as described herein. In other embodiments, one or more of the components shown in FIG. 1 are implemented in hardware via semiconductor devices, chips, logical gates, circuits, circuit cards, and/or other physical hardware devices in lieu of, or in addition to, a processor-based system.

Figure 8:
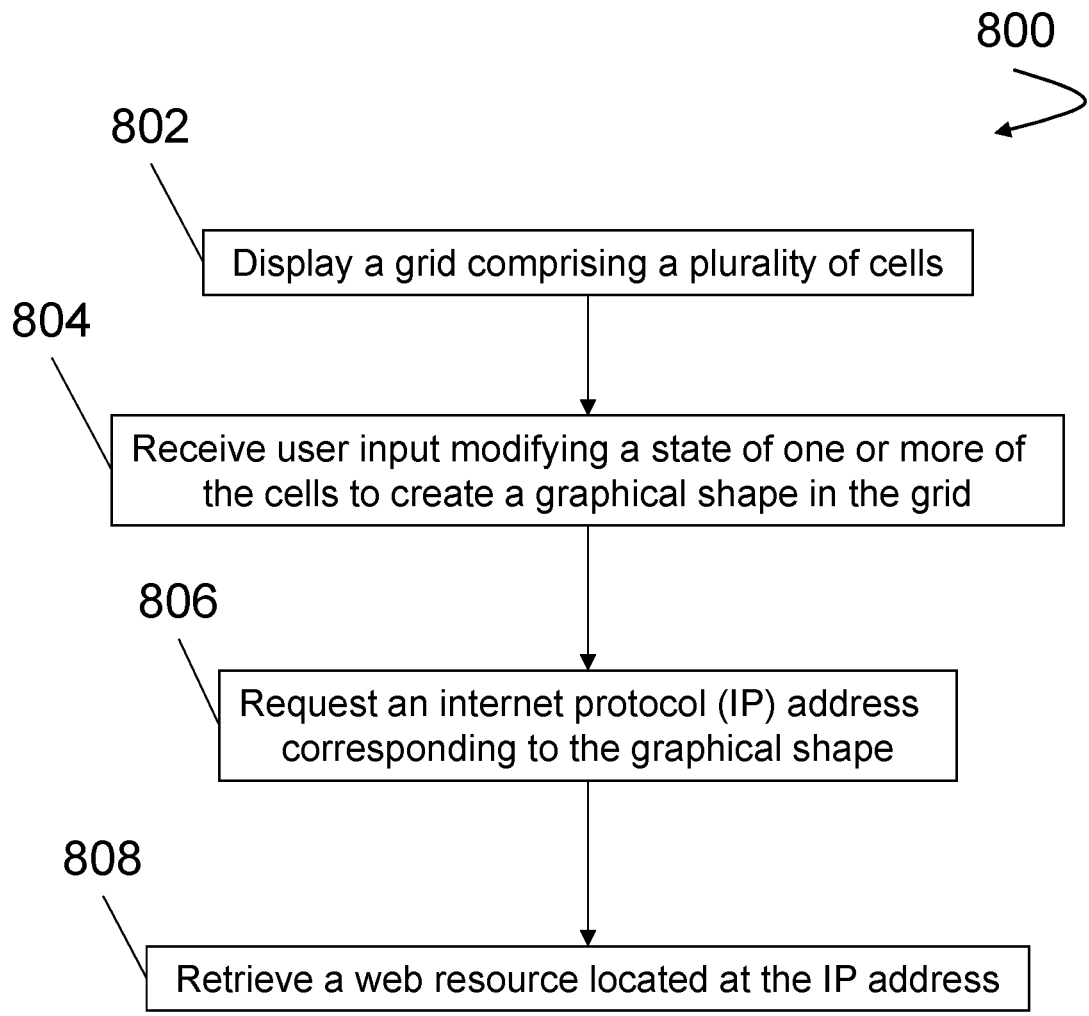
FIG. 8 is a flow chart depicting one embodiment of an example method of using a graphical resource identifier.

FIG. 8 is a flow chart depicting one embodiment of an example method 800 of using a graphical resource identifier. The method 800 can be implemented by a system, such as system 100 described above. For example, the method 800 can be implemented by a CPU, such as CPU 122A or 122B in system 100, executing instructions, such as instructions 140. It is to be understood that the order of actions in example method 800 is provided for purposes of explanation and that the method can be performed in a different order in other embodiments. Similarly, it is to be understood that some actions can be omitted or additional actions can be included in other embodiments.

At 802, a grid comprising a plurality of cells is displayed. As discussed above, the grid can be of any suitable shape and size, such as, but not limited to, a grid of 4 cells by 4 cells, a grid of 5 cells by 5 cells, a grid of 4 cells by 3 cells, etc. Furthermore, as discussed above, displaying the grid can be triggered in response to detecting user input or an event. For example, a user can click on a displayed button indicating that the grid should be displayed or the opening of a new tab can be detected and the grid is displayed in the new blank tab of a browser.

At 804, user input is received modifying the state of one or more of the plurality of cells. As discussed above, each cell is limited to one of a plurality of predefined states. The user can modify the state of a cell, for example, by drawing a line corresponding to one of the predefined states in some embodiments, as discussed above. In other embodiments, the user can click or tap on the cell to cycle through the predefined states, as discussed above. The modified states of the one or more cells together create a graphical shape in the grid. The graphical shape formed by the cells of the grid is also referred to herein as a graphical resource identifier.

At 806, an internet protocol (IP) address corresponding to the graphical shape is requested. As discussed above, in some embodiments, requesting the IP address includes converting the graphical shape to a punycode corresponding to the graphical shape and requesting the IP address based on the converted punycode. For example, the punycode can be transmitted to a DNS server to request the IP address. Converting the graphical shape to a punycode prior to transmitting a request to a DNS server has the advantage of not requiring any changes to operation of the DNS server since the use of registered punycodes is already supported by DNS servers.

In some embodiments, converting the graphical shape to a punycode is based on detecting coordinates of lines and/or shading of the cells. For example, as discussed above, the plurality of predefined states can include one or more lines connecting predefined points along edges of each cell. In some embodiments, each allowed state includes only one line in each cell. In other embodiments, more than one line is allowed in a predefined state of each cell. Additionally, in some embodiments, the predefined states are limited to diagonal lines extending from one corner of the cell to another corner of the cell, as discussed above. In other embodiments, other diagonal lines connecting other predefined points along edges of the cell are allowed. Additionally, in some embodiments, vertical and horizontal lines are allowed in the predefined states. Furthermore, in some embodiments, the plurality of predefined states includes shading of regions defined in each cell by the one or more lines. Additionally, in some embodiments, the plurality of predefined states includes variations in color of the one or more lines and/or regions of the cell defined by the one or more lines.

Thus, in some embodiments, the coordinates of the lines and/or endpoints of the lines are detected along with coordinates of shaded regions, if permitted, are detected. The detected coordinates can be used to look up the corresponding punycode in a registry. For example, the processor can be communicatively coupled to a GRI server which is used to register or association a graphical resource identifier with a punycode. The processor can be coupled to the GM server using an API as discussed above. The GRI server in such embodiments is not the same as a DNS server.

Alternatively, each predefined state can be associated with a predefined value. For example, in the embodiment of FIG. 3, the state associated with cell 304 can be assigned a value of 1, the state associated with cell 306 can be assigned a value of 2, and the state associated with cell 308 can be assigned a value of 3. The values of each cell can be combined to obtained a unique value for the graphical resource identifier. For example, in the embodiment of FIG. 4, the values can be concatenated together starting at the upper left corner and going row by row from left to right. Thus, the value for the example graphical resource identifier depicted in FIG. 4 would be 3333311332233333. This value can converted to a binary value in some embodiments. Additionally, other types of values, such as alphanumeric values, can be used in other embodiments. The value for the graphical resource identifier can be registered with a GM server to associate the value with a given punycode. Thus, as with detected coordinates, the corresponding punycode can be looked up and retrieved from the GM server.

It is to be understood that other techniques for converting the graphical resource identifier can be used in other embodiments. Furthermore, it is to be understood that, in other embodiments, requesting the IP address can include transmitting the graphical resource identifier to a DNS server without performing a conversion. In such embodiments, the DNS server is configured to process the graphical resource identifier to identify the IP address. In some such embodiments, the DNS server converts the graphical resource identifier to a punycode used to obtain the IP address. In other embodiments, the DNS server registers an association of the graphical resource identifier directly with the corresponding IP address without needing to convert first to a punycode.

At 808, the IP address is corresponding to the graphical resource identifier is received and the corresponding web resource is retrieved. For example, the DNS server can transmit the IP address to the browser via which the graphical resource identifier was input. In response to receiving the IP address, the processor retrieves the web resource located at the IP address. The web resource can be a web page, a web application, audio or video file, etc. Thus, through the embodiments described herein, a user is able to locate and retrieve a desired web resource using a graphical resource identifier which overcomes the difficulties discussed above with respect to language and regional differences.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A computer-implemented method comprising:
    displaying a grid comprising a plurality of cells;
    receiving user input individually modifying a state of one or more of the plurality of cells to create a non-textual based graphical shape in the grid, wherein each of the plurality of cells is configured to accept only a predetermined set of non-textual patterns such that each of the plurality of cells is limited to a predetermined number of possible predefined states;
    requesting an internet protocol (IP) address using the non-textual based graphical shape as a resource identifier for a web resource located at the IP address, wherein requesting the IP address using the non-textual based graphical shape comprises:
        converting the non-textual based graphical shape into a punycode corresponding to the non-textual based graphical shape; and
        transmitting the punycode to a Domain Name System (DNS) server to request the IP address based on the punycode; and
    in response to receiving the IP address corresponding to the non-textual based graphical shape, retrieving the web resource located at the IP address.

2. The computer-implemented method of claim 1, wherein converting the non-textual based graphical shape into the punycode comprises:
    detecting coordinates of one or more lines in respective one or more of the plurality of cells; and
    looking up the detected coordinates of the one or more lines in a registry associating coordinates of lines in the grid with respective punycodes.

3. The computer-implemented method of claim 1, wherein converting the non-textual based graphical shape into the punycode comprises:
    calculating a value for the grid based on respective values assigned to each of the cells, wherein each cell has a value corresponding to a predetermined value for each of the possible predefined states; and
    looking up the calculated value in a registry associating values of the grid with respective punycodes.

4. The computer-implemented method of claim 1, wherein the predetermined set of non-textual patterns comprises one or more lines connecting predefined points along edges of each cell.

5. The computer-implemented method of claim 4, wherein each of the non-textual patterns includes only a single line.

6. The computer-implemented method of claim 4, wherein the predetermined set of non-textual patterns further comprises shading of regions defined by the edges of each cell and the one or more lines connecting predefined points along the edges of each cell.

7. The computer-implemented method of claim 1, wherein the predetermined number of possible predefined states comprises three predefined states;
    wherein the three predefined states are a first state having only a diagonal line extending from an upper right corner to a lower left corner of a cell, a second state having only a diagonal line extending from an upper left corner to a lower right corner of a cell, and a third state having no lines.

8. The computer-implemented method of claim 1, wherein the non-textual based graphical shape is a web address for the web resource.

9. A computer system comprising:
    a display device configured to display a grid comprising a plurality of cells;
    a user input device configured to receive user input individually modifying a state of one or more of the plurality of cells to create a non-textual based graphical resource identifier in the grid, wherein each of the plurality of cells is configured to accept only a predetermined set of non-textual patterns such that each of the plurality of cells is limited to a predetermined number of possible predefined states;
a network interface; and
a processor communicatively coupled to the display device, the user input device, and the network interface, wherein the processor is configured to:
request, via the network interface, an internet protocol (IP) address using the non-textual based graphical resource identifier as a resource identifier for a web resource located at the IP address by:
converting the non-textual based graphical resource identifier into a punycode corresponding to the non-textual based graphical resource identifier; and
transmitting the punycode to a Domain Name System (DNS) server via the network interface to request the IP address based on the punycode; and
retrieve, via the network interface, the web resource located at the IP address in response to receiving the IP address corresponding to the non-textual based graphical resource identifier.

10. The computer system of claim 9, wherein the processor is configured to convert the non-textual based graphical resource identifier into the punycode by:
detecting coordinates of one or more lines in respective one or more of the plurality of cells; and
looking up the detected coordinates of the one or more lines in a registry associating coordinates of lines in the grid with respective punycodes.

11. The computer system of claim 9, wherein the processor is configured to convert the non-textual based graphical resource identifier into the punycode by:
calculating a value for the grid based on respective values assigned to each of the cells, wherein each cell has a value corresponding to a predetermined value for each of the possible predefined states; and
looking up the calculated value in a registry associating values of the grid with respective punycodes.

12. The computer system of claim 9, wherein the predetermined set of non-textual patterns comprises one or more lines connecting predefined points along edges of each cell, and wherein the graphical resource identifier comprises at least two cells.

13. The computer system of claim 12, wherein the predetermined set of non-textual patterns further comprises shading of regions defined by the edges of each cell and the one or more lines connecting predefined points along the edges of each cell.

14. A computer program product comprising a computer readable storage medium having a computer readable program stored therein, wherein the computer readable program, when executed by a processor, causes the processor to perform a method comprising:
displaying a grid comprising a plurality of cells;
receiving user input individually modifying a state of one or more of the plurality of cells to create a non-textual based graphical shape in the grid, wherein each of the plurality of cells is configured to accept only a predetermined set of non-textual patterns such that each of the plurality of cells is limited to a predetermined number of possible predefined states;
requesting an internet protocol (IP) address using the non-textual based graphical shape as a resource identifier for a web resource located at the IP address, wherein requesting the IP address using the non-textual based graphical shape comprises:
converting the non-textual based graphical shape into a punycode corresponding to the non-textual based graphical shape; and
transmitting the punycode to a Domain Name System (DNS) server to request the IP address based on the punycode; and
in response to receiving the IP address corresponding to the non-textual based graphical shape, retrieving the web resource located at the IP address.

15. The computer program product of claim 14, wherein converting the non-textual based graphical shape into the punycode comprises:
detecting coordinates of one or more lines in respective one or more of the plurality of cells; and
looking up the detected coordinates of the one or more lines in a registry associating coordinates of lines in the grid with respective punycodes.

16. The computer program product of claim 14, wherein converting the non-textual based graphical shape into the punycode comprises:
calculating a value for the grid based on respective values assigned to each of the cells, wherein each cell has a value corresponding to a predetermined value for each of the possible predefined states; and
looking up the calculated value in a registry associating values of the grid with respective punycodes.

17. The computer program product of claim 14, wherein the predetermined set of non-textual patterns comprises one or more lines connecting predefined points along edges of each cell.

18. The computer program product of claim 17, wherein each of the non-textual patterns includes only a single line.

19. The computer program product of claim 17, wherein the predetermined set of non-textual patterns further comprises shading of regions defined by the edges of each cell and the one or more lines connecting predefined points along the edges of each cell.

* * * * *